United States Patent
Chen et al.

(10) Patent No.: US 10,270,634 B2
(45) Date of Patent: Apr. 23, 2019

(54) SIGNAL TRANSMISSION APPARATUS AND MULTICARRIER COMMUNICATION SYSTEM

(71) Applicant: FUJITSU LIMITED, Kawasaki (JP)

(72) Inventors: Hao Chen, Beijing (CN); Lei Li, Beijing (CN); Weizhen Yan, Beijing (CN); Bo Liu, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 15/258,359

(22) Filed: Sep. 7, 2016

(65) Prior Publication Data
US 2016/0380793 A1    Dec. 29, 2016

Related U.S. Application Data

(63) Continuation of application No. PCT/CN2015/073599, filed on Mar. 4, 2015.

(30) Foreign Application Priority Data

Mar. 7, 2014    (CN) .......................... 2014 1 0083273

(51) Int. Cl.
| | |
|---|---|
| H04L 27/26 | (2006.01) |
| H04L 25/02 | (2006.01) |
| H04L 1/20 | (2006.01) |
| H04B 10/077 | (2013.01) |
| H04L 1/00 | (2006.01) |

(Continued)

(52) U.S. Cl.
CPC ..... H04L 27/2601 (2013.01); H04B 10/0775 (2013.01); H04L 1/0003 (2013.01);
(Continued)

(58) Field of Classification Search
CPC .. H04K 1/10; H04L 1/20; H04L 25/02; H04L 26/06; H04L 27/26; H04W 48/20
See application file for complete search history.

(56) References Cited

U.S. PATENT DOCUMENTS

| | | |
|---|---|---|
| 2004/0264588 A1 | 12/2004 | Song et al. |
| 2009/0003468 A1* | 1/2009 | Karabulut ............. H04L 5/0007 375/260 |

(Continued)

FOREIGN PATENT DOCUMENTS

| | | |
|---|---|---|
| CN | 1567758 | 1/2005 |
| CN | 101170531 | 4/2008 |

(Continued)

OTHER PUBLICATIONS

Bingham, "ADSL, VDSL, and Multicarrier Modulation", 5th chapter, 2000, (302 pages).

(Continued)

*Primary Examiner* — George C Atkins
(74) *Attorney, Agent, or Firm* — Staas & Halsey LLP

(57) ABSTRACT

A signal transmission apparatus includes: a first receiving unit to receive a probe signal transmitted by transmitting end; wherein, the signal is generated based on a recommended signal configuration from previous signal to noise ratio (SNR) probings; a first processing unit to probe a channel SNR according to the signal; a first determining unit to determine transmission signal configuration and signal transmission performance of a final channel SNR obtained by multiple SNR probings; and a first transmitting unit to transmit the configuration and the performance to the transmitting end, where the transmitting end transmits an actual transmission signal according to the configuration and the performance.

10 Claims, 10 Drawing Sheets

(51) Int. Cl.
*H04W 52/08* (2009.01)
*H04L 5/00* (2006.01)
*H04J 11/00* (2006.01)

(52) U.S. Cl.
CPC .............. *H04L 1/0025* (2013.01); *H04L 1/20* (2013.01); *H04L 1/203* (2013.01); *H04L 5/0048* (2013.01); *H04L 25/0202* (2013.01); *H04L 27/2646* (2013.01); *H04W 52/08* (2013.01); *H04J 11/00* (2013.01); *H04L 5/006* (2013.01); *H04L 5/0046* (2013.01)

(56) References Cited

U.S. PATENT DOCUMENTS

2009/0103666 A1  4/2009  Zhao et al.
2015/0098392 A1* 4/2015  Homchaudhuri ..... H04W 48/20
                                                370/329

FOREIGN PATENT DOCUMENTS

| CN | 101808369 | 8/2010 |
| CN | 102413557 | 4/2012 |
| EP | 2387171 | 11/2011 |

OTHER PUBLICATIONS

IEEE P802.16e, "IEEE standard for local and metropolitan area networks", Part 16: Air Interface for Fixed and Mobile Broadband Wireless Access Systems Amendment 2: Physical and Medium Access Control Layers for Combined Fixed and Mobile Operation in Licensed Bands and Corrigendum, IEEE Computer Society and the IEEE Microwave Theory and Techniques Society 1 Feb. 28, 2006, (864 pages).
Written Opinion of International Searching Authority, dated Jun. 3, 2015 corresponding to International Application No. PCT/CN2015/073599.
International Search Report dated Jun. 3, 2015 corresponding to International Application No. PCT/CN2015/073599.
Extended European Search Report dated Oct. 10, 2017 in European Patent Application No. 15759327.8.
Andre Nuno Sequeira et al: "Equalization techniques for high-speed OFDM-based access systems using direct modulation and direct detection", 2013 15th International Conference on Transparent Optical Networks (ICTON), IEEE, Jun. 23, 2013 (Jun. 23, 2013), pp. 1-6, XP032484203.
Peng Linning et al: "On Bit-Loading for Discrete Multi-Tone Transmission Over Short Range POF Systems", Journal of Lightwave Technology, IEEE Service Center, New York, NY, US, vol. 31, No. 24, Dec. 1, 2013 (Dec. 1, 2013), pp. 4155-4165, XP011533030.
Chinese Office Action dated Jul. 7, 2017 in Chinese Patent Application No. 201410083273.7.
Jin-dong Zhang, et al., "Radar Adaptive Range Sidelobe Suppression Based on Recursive MSNR Criteria", Journal of Nanjing University of Science and Technology (Natural Science), vol. 33, No. 3, Jun. 2009, 5 pages.

* cited by examiner

SIGNAL TRANSMISSION APPARATUS AND MULTICARRIER COMMUNICATION SYSTEM

CROSS-REFERENCE TO RELATED APPLICATIONS

This application is a continuation application, filed under 35 U.S.C. § 111(a), of International Application PCT/CN2015/073599 filed on Mar. 4, 2015 and claims foreign priority to Chinese Patent Application No. 201410083273.7, filed Mar. 7, 2014, the content of which is incorporated herein by reference in its entirety.

BACKGROUND

1. Field

The present disclosure relates to the field of communications, and in particular to a signal transmission apparatus and multicarrier communication system.

2. Description of the Related Art

A multicarrier communication system is a communication system based on multicarrier modulation, which is widely used in wireless and access networks at present due to its advantages, such as high transmission rate, high spectral efficiency, and multipath and frequency domain fading proof, and to which wide attention is paid and studied as being taken as an important solution for future higher speed and complex network communications.

A channel signal to noise ratio (SNR) probing technique is a necessary technique important to the multicarrier communication system. FIG. 1 is a schematic diagram of a channel probing stage in the multicarrier communication system. As shown in FIG. 1, its main function is that before actual transmission, channel information is collected by using a probe signal, so as to estimate signal to noise ratios of subcarriers of a channel at the actual transmission stage; then modulation formats and power allocation adopted at the actual transmission stage are selected for available subcarriers in an adaptive optimization or direct designation manner according to recommended actual transmission signal configuration selected according to the signal to noise ratios, such as abandoning channel subcarriers of bad conditions, so as to improve a transmission rate or performance. It can be seen that before actual transmission, obtaining a signal to noise ratio consistent with that in the actual transmission by using the probe signal is key to success of the transmission. This is because that first, optimal transmission configuration can be obtained and transmission efficiency can be maximized only when a correct channel signal to noise ratio in the actual transmission is obtained; and second, the transmission performance can be accurately estimated and services can be provided to design of the system only when the signal to noise ratio in the actual transmission is correctly obtained before the actual transmission, such as avoiding invalid transmission unsatisfying traffic demands, etc.

Currently, methods for probing a channel signal to noise ratio of each subcarrier are relatively simple and direct. FIG. 2 is a schematic diagram of a method for probing a channel signal to noise ratio of each subcarrier in the relevant art. As shown in FIG. 2, a predefined probe signal is generated at and transmitted from a transmitting end, and the signal to noise ratio of each subcarrier is obtained by comparing an original probe signal with the predefined probe signal after it is subjected to channel transmission and receiving end processing; then, based on an important assumption that a signal to noise ratio of a probe signal may feature a signal to noise ratio of an actually transmitted signal, the signal to noise ratio of each subcarrier at the actual transmission stage is directly obtained. For example, IEEE 802.16e is a standard provided by the IEEE for wideband wireless metropolitan area network communications, in which an adaptive modulation technique of the applied scalable orthogonal frequency division multiple access determines channel modulation under different channel conditions based on such a method for probing a channel signal to noise ratio.

Documents advantageous to the understanding of the present disclosure and conventional technologies are listed below, and are incorporated herein by reference, as they are fully described in this text.

Reference 1: John A. C. Bingham, ADSL, VDSL, and Multicarrier Modulation, 5th chapter, 2000; and Reference 2: IEEE P802.16e, IEEE standard for local and metropolitan area networks, 2005.

It should be noted that the above description of the background art is merely provided for clear and complete explanation of the present disclosure and for easy understanding by those skilled in the art. And it should not be understood that the above technical solution is known to those skilled in the art as it is described in the background art of the present disclosure.

SUMMARY

Additional aspects and/or advantages will be set forth in part in the description which follows and, in part, will be apparent from the description, or may be learned by practice of the disclosure.

However, it was found by the inventors that in the above relevant art, when a channel is linear, the above assumption is tenable. But for a channel of obvious nonlinearity, as bandwidths and power spectra, etc., of a probe signal and an actually transmitted signal, are different, their signal to noise ratios are also different, hence, deviation will occur in the above assumption.

Being limited to hardware process and cost, nonlinearity usually exists in an actual system. The nonlinearity will make a signal to noise ratio measured in a probing stage unable to accurately feature a signal to noise ratio at an actual transmission stage, and transmission configuration obtained based on the inaccurate signal to noise ratio at the probing stage is also not optimal, influence of which being directly embodied by great increase of a probability of out-of-range of a bit error at the actual transmission stage, thereby greatly affecting stability of the transmission system. A method counteracting such deviation in an existing system and application is at a cost of sacrificing efficiency of the system, artificially preserving sufficient performance margins. However, for a future communication application of a high rate, a high density and a low cost, the method of artificially preserving sufficient performance margins will obviously applicable no longer.

Embodiments of the present disclosure provide a signal transmission apparatus and multicarrier communication system, with an aim of not only reducing deviation of a signal to noise ratio probed in the last time of recursion from a signal to noise ratio at an actual transmission stage and improving accuracy of a nonlinear channel signal to noise ratio probing, but also accurately predicting transmission performance at the actual transmission stage according to a correct signal to noise ratio and recommended signal configuration, so as to provide support to flexible system adaptive control reception, thereby ensuring reliability and stability of the communication system.

According to an aspect of the embodiments of the present disclosure, there is provided a signal transmission apparatus, including:

a first receiving unit configured to receive a probe signal transmitted by a transmitting end; wherein, the probe signal is generated according to characteristics of recommended signal configuration obtained by previous one or more times of signal to noise ratio probing;

a first processing unit configured to probe a channel signal to noise ratio according to the probe signal;

a first determining unit configured to determine transmission signal configuration and signal transmission performance according to a final channel signal to noise ratio obtained by multiple times of signal to noise ratio probing; and a first transmitting unit configured to transmit the transmission signal configuration and the signal transmission performance to the transmitting end, so that the transmitting end transmits an actual transmission signal according to the transmission signal configuration and the signal transmission performance.

According to another aspect of the embodiments of the present disclosure, there is provided a signal transmission apparatus, including:

a second processing unit configured to generate a probe signal for probing a channel signal to noise ratio according to characteristics of recommended signal configuration obtained by previous one or more times of signal to noise ratio probing;

a second receiving unit configured to receive transmission signal configuration and signal transmission performance transmitted by a receiving end; and a third transmitting unit configured to transmit an actual transmission signal according to the transmission signal configuration and the signal transmission performance.

According to a further aspect of the embodiments of the present disclosure, there is provided a multicarrier communication system, including:

a receiver configured to receive a probe signal transmitted by a transmitter, probe a channel signal to noise ratio according to the probe signal, determine transmission signal configuration and signal transmission performance according to a final channel signal to noise ratio obtained by multiple times of signal to noise ratio probing, and transmit the transmission signal configuration and the signal transmission performance to the transmitter; and the transmitter configured to generate and transmit the probe signal, the probe signal being generated according to characteristics of recommended signal configuration obtained by previous one or more times of signal to noise ratio probing, receive the transmission signal configuration and the signal transmission performance transmitted by the receiver, and transmit an actual transmission signal according to the transmission signal configuration and the signal transmission performance.

An advantage of the embodiments of the present disclosure exists in that by probing channel SNR based on multiple times of recursion, not only reducing deviation of a signal to noise ratio probed in the last time of recursion from a signal to noise ratio at an actual transmission stage and improving accuracy of a nonlinear channel signal to noise ratio probing, but also accurately predicting transmission performance at the actual transmission stage according to a correct signal to noise ratio and recommended signal configuration, so as to provide support to flexible system adaptive control reception, thereby ensuring reliability and stability of the communication system.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
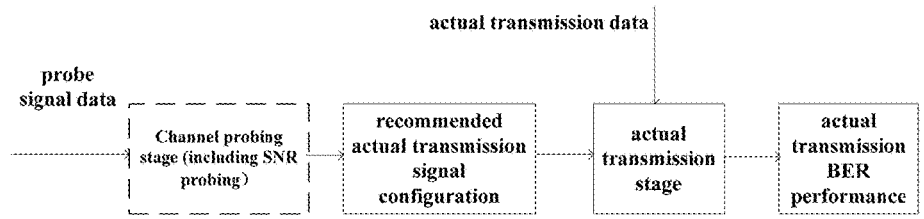
FIG. 1 is a schematic diagram of a channel probing stage in the multicarrier communication system.
Figure 2:
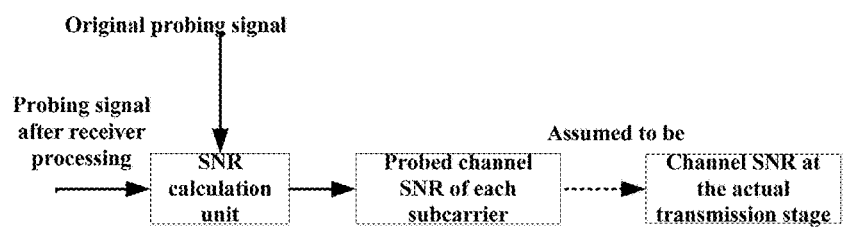
FIG. 2 is a schematic diagram of a method for probing a channel signal to noise ratio of each subcarrier in the relevant art.
Figure 3:
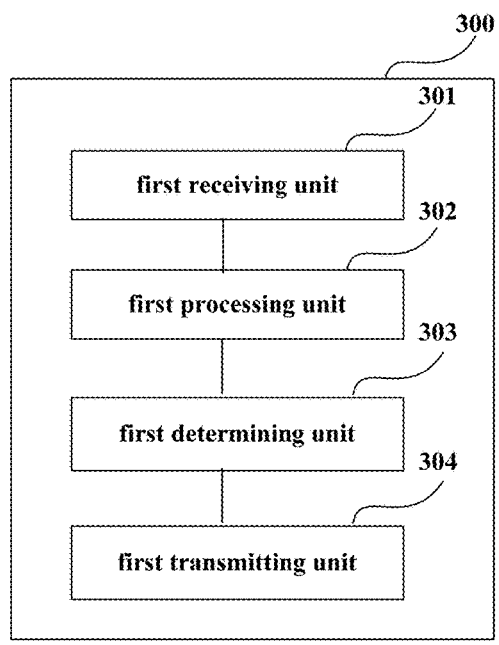
FIG. 3 is a schematic diagram of a structure of the signal transmission apparatus of Embodiment 1 of the present disclosure.

An embodiment of the present disclosure provides a signal transmission apparatus. FIG. 3 is a schematic diagram of a structure of the signal transmission apparatus of the embodiment of the present disclosure. As shown in FIG. 3, the signal transmission apparatus 300 includes:

a first receiving unit 301 configured to receive a probe signal transmitted by a transmitting end; the probe signal is generated according to characteristics of recommended signal configuration obtained by previous one or more times of signal to noise ratio probing;

a first processing unit 302 configured to probe a channel signal to noise ratio according to the probe signal;

a first determining unit 303 configured to determine transmission signal configuration and signal transmission performance according to a final channel signal to noise ratio obtained by multiple times of signal to noise ratio probing; and a first transmitting unit 304 configured to transmit the transmission signal configuration and the signal transmission performance to the transmitting end, so that the transmitting end transmits an actual transmission signal according to the transmission signal configuration and the signal transmission performance.

In this embodiment, the characteristics of the recommended signal configuration are one or more of the following: a power allocation characteristic, a bit allocation characteristic, and a bandwidth characteristic. The above characteristics wholly or partially embody a contribution of a nonlinear noise of a signal at an actual transmission stage to the signal to noise ratio, thereby being more advantageous to reducing deviation of a signal to noise ratio probed at latter time of recursion from a signal to noise ratio at the actual transmission stage. For example, the power allocation characteristic may be that power allocation of each subcarrier also satisfies a recommended configured power allocation relationship, and the bit allocation characteristic may be a modulation format of each subcarrier, etc., and this embodiment is not limited thereto.

In this embodiment, configuration of a predetermined probe signal probed for a first time may be determined by using the relevant art, and this embodiment is not limited thereto.

In this embodiment, the number of times of the signal to noise ratio probing, that is, the number of times of recursion of the signal to noise ratio probing, may be any predetermined value, and this embodiment is not limited thereto.

In this embodiment, the transmission signal configuration may include such configuration information of a signal as power allocation, bit allocation, and a bandwidth, etc., and the transmission performance may include determining such performance of the signal as a bit error rate, and a Q value margin, etc., and this embodiment is not limited thereto.

In this embodiment, the signal transmission apparatus may further include a preprocessing unit (not shown) configured to preprocess the probe signal received by the first receiving unit 301, and the first processing unit 302 is configured to probe the signal to noise ratio according to the probe signal processed by the preprocessing unit; the preprocessing may include equalization processing, etc., and this embodiment is not limited thereto.

With the above signal transmission apparatus, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

Embodiment 2

Figure 4:
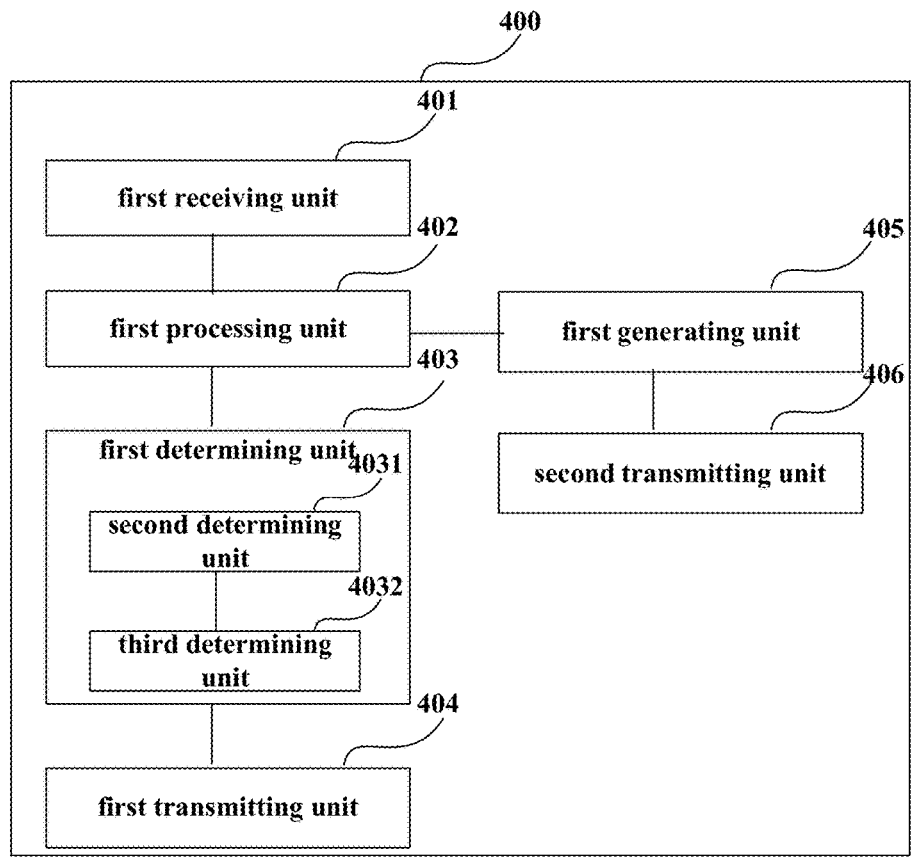
FIG. 4 is a schematic diagram of a structure of the signal transmission apparatus of Embodiment 2 of the present disclosure.

An embodiment of the present disclosure provides a signal transmission apparatus. FIG. 4 is a schematic diagram of a structure of the signal transmission apparatus of the embodiment of the present disclosure. As shown in FIG. 4, the signal transmission apparatus 400 includes a first receiving unit 401, a first processing unit 402, a first determining unit 403 and a first transmitting unit 404, implementations of which being identical to those of the first receiving unit 301, the first processing unit 302, the first determining unit 303 and the first transmitting unit 304 in Embodiment 1, and being not going to be described herein any further.

In this embodiment, as shown in FIG. 4, in order that the transmitting end generates probe signals containing whole or partial characteristics of more actually transmitted signals, and reduces deviation between a signal to noise ratio probed at the latter time of recursion and a signal to noise ratio at the actual transmission stage, the signal transmission apparatus 400 may further include:
- a first generating unit 405 configured to generate the recommended signal configuration according to a channel signal to noise ratio obtained in each time of probing; and
- a second transmitting unit 406 configured to transmit the recommended signal configuration to the transmitting end, so that the transmitting end generates and transmits the probe signal according to the characteristics of the recommended signal configuration.

In an implementation, the first determining unit 403 further includes:
- a second determining unit 4031 configured to determine the transmission signal configuration according to a finally probed channel signal to noise ratio after the number of times of signal to noise ratio probing by the first processing unit reaches a first threshold value; and
- a third determining unit 4032 configured to determine the signal transmission performance according to the channel signal to noise ratio finally probed by the first processing unit 402 and the transmission signal configuration determined by the second determining unit 4031.

In this embodiment, the second determining unit 4031 is configured to use a channel signal to noise ratio probed after the number of times of signal to noise ratio probing by the first processing unit 402 reaches the first threshold value as a final channel signal to noise ratio, and determine the transmission signal configuration by using the final channel signal to noise ratio to perform adaptive modulation allocation.

A method for obtaining the transmission signal configuration by using the signal to noise ratio to perform adaptive modulation allocation may use the relevant art. For example, a target of a bit error rate of the adaptive modulation allocation is set to be 1e-3, and an allocation criterion is that a rate is optimal, etc.; and furthermore, the first threshold value may be arbitrarily set as demanded, and what described here is illustrative only, and this embodiment is not limited thereto.

Figure 5:
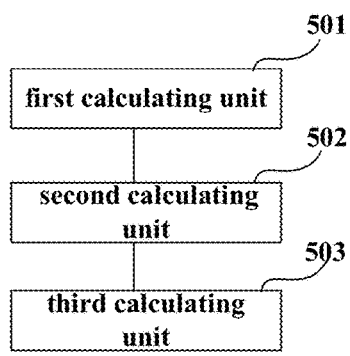
FIG. 5 is a schematic diagram of a structure of the third determining unit 4032 of Embodiment 2 of the present disclosure.

FIG. 5 is a schematic diagram of an implementation of the third determining unit 4032 of the embodiment of the present disclosure. As shown in FIG. 5, the third determining unit 4032 may include:
- a first calculating unit 501 configured to calculate a first signal to noise ratio margin value under given power allocation and bit allocation according to a signal to noise ratio and symbol error rate target on each subcarrier;
- a second calculating unit 502 configured to calculate a second signal to noise ratio margin value for a bit error rate according to a difference between definitions of a symbol error rate and a bit error rate; and
- a third calculating unit 503 configured to calculate the signal transmission performance according to the first signal to noise ratio margin value calculated by the first calculating unit 501 and the second signal to noise ratio margin value calculated by the second calculating unit 502.

It can be seen from the embodiment of the present disclosure that calculating a extra signal to noise ratio margin value for a bit error rate based according to a difference between definitions of a symbol error rate and a bit error rate, thereby improving accuracy of prediction of the transmission performance.

Figure 6:
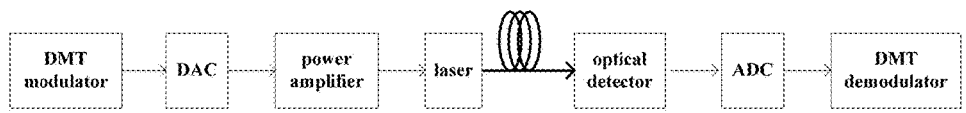
FIG. 6 is a schematic diagram of a structure of the DMT transmission system of Embodiment 2 of the present disclosure.

The signal transmission apparatus of the embodiment of the present disclosure shall be described below taking an optical discrete multi-tone (DMT) modulation transmission system as an example. FIG. 6 is a schematic diagram of a structure of the DMT transmission system. The number of subcarriers in the DMT transmission system may be set as demanded, a digital signal sampling rate is 64 Gsa/s (gigasamples per second), and a laser is a low-side device, hence there exists relatively large nonlinearity.

Figure 7:
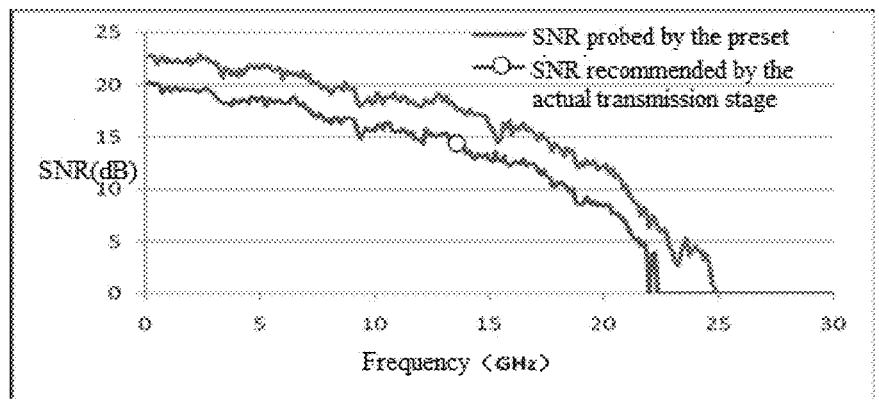
FIG. 7 is a schematic diagram of comparison of a curve of signal to noise ratio of a signal transmission method in the relevant art and a curve of a signal to noise ratio at an actual transmission stage relevant art.

FIG. 7 is a schematic diagram of comparison of a curve of a signal transmission method in the relevant art and a curve of a signal to noise ratio at an actual transmission stage relevant art. As shown in FIG. 7, the curve of the signal to noise ratio probed by using the relevant art is higher than the curve of the actually transmitted signal to noise ratio by 2 dB, that is, the channel signal to noise ratio is over-estimated in the relevant art, which may result in that actually transmitted bit error performance is degraded and even result in transmission failure, and such deviation of signal to noise ratios is originated from that spectral characteristics of transmission signals at the probing stage and at the actual transmission stage are different, hence the nonlinear noises are different.

Figure 8:
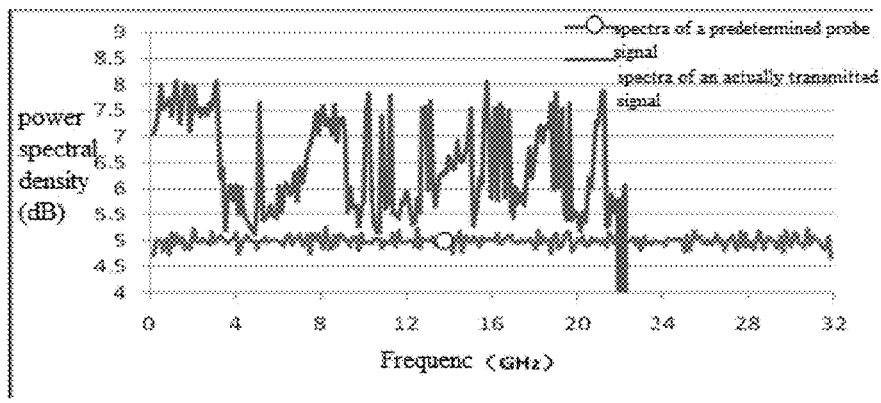
FIG. 8 is a schematic diagram of comparison of power spectra of a predetermined probe signal in the relevant art and power spectra of an actually transmitted signal relevant art.

FIG. 8 is a schematic diagram of comparison of power spectra of a predetermined probe signal in the relevant art and power spectra of an actually transmitted signal relevant art. As shown in FIG. 8, as a spectral characteristics of the actually transmitted signal is determined by a bit power allocation algorithm, in which such operations as abandoning subcarriers and optimizing power, etc., are contained, the spectrum of the actually transmitted signal is obvious different from that of the predetermined probe signal.

Figure 9:
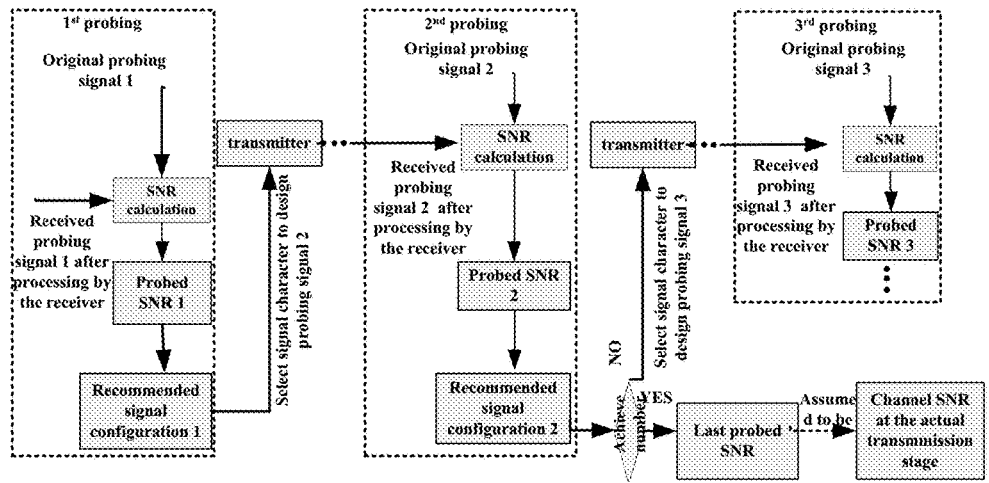
FIG. 9 is a schematic diagram of a method for probing a channel signal to noise ratio of each subcarrier based on multiple times of recursion of an embodiment of the present disclosure.

FIG. 9 is a schematic diagram of a method for probing a channel signal to noise ratio of each subcarrier based on multiple times of recursion of the embodiment of the present disclosure. With the signal transmission apparatus in the above embodiment, as shown in FIG. 9, assuming that the predetermined number of times of recursion of probing the signal to noise ratio is 2, predetermined probe signal configuration of the first time of probing is a pseudo-random sequence of a known data source, power of all subcarriers is identical and their modulation formats are QPSK, and a probe signal of the first time of recursion is identical to the probe signal probed by using an existing method, recommended signal configuration 1 is given according to a signal to noise ratio 1 obtained in the first time of probing, and all or part of characteristics are selected according to configuration 1, and a probe signal 2 is generated; for example, available subcarriers of the second time of probe signal adopt available subcarriers of the recommended signal configuration probed at the first time, power allocation of the subcarriers satisfying a power allocation relationship of the recommended configuration, modulation formats of the subcarriers being all QPSK, etc., and signal to noise ratio 2 is calculated according to probe signal 2. At this moment, as probe signal 2 contains all or part of the characteristics of the more actually transmitted signals, signal to noise ratio 2 is more close to the nonlinear noise at the actual transmission stage than signal to noise ratio 1, that is, the probing of the signal to noise ratio is more accurate.

Figure 10:
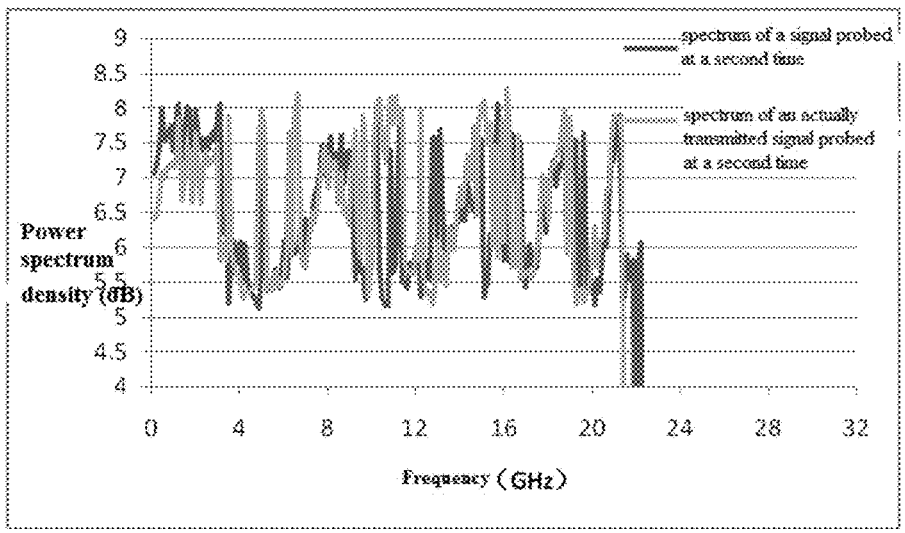
FIG. 10 is a schematic diagram of comparison of a spectrum of a signal and a spectrum of an actually transmitted signal probed at a second time of Embodiment 2 of the present disclosure.
Figure 11:
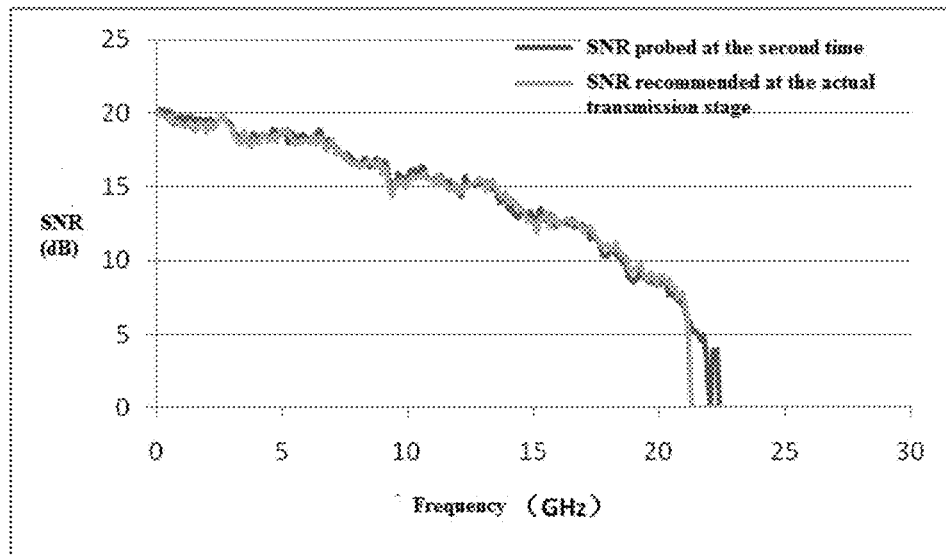
FIG. 11 is a schematic diagram of comparison of a curve of the signal to noise ratio probed in two times of recursion and a curve of the actually transmitted signal to noise ratio of Embodiment 2 of the present disclosure.

FIG. 10 is a schematic diagram of comparison of a spectrum of a signal and a spectrum of an actually transmitted signal probed at the second time of Embodiment 2 of the present disclosure, and FIG. 11 is a schematic diagram of comparison of a curve of the signal to noise ratio probed in two times of recursion and a curve of the actually transmitted signal to noise ratio of the embodiment of the present disclosure. As shown in FIGS. 10 and 11, with the signal transmission apparatus of the above embodiment, in a case of obvious nonlinearity, the signal to noise ratio at the actual transmission stage may still be accurately probed.

Figure 12:
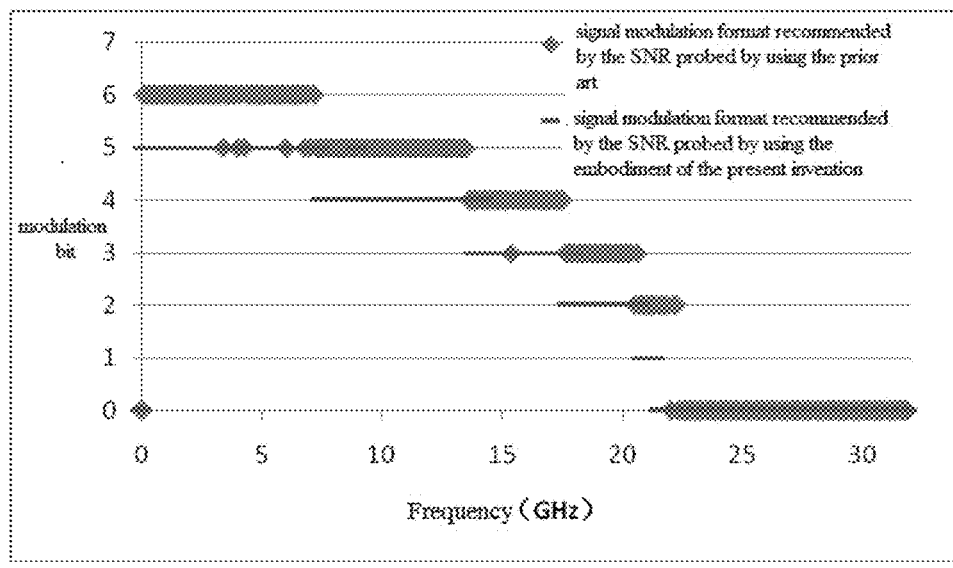
FIG. 12 is a schematic diagram of comparison of a transmission signal modulation format obtained by taking the signal to noise ratio probed by using the probing method in the relevant art as input and a transmission signal modulation format obtained by taking the signal to noise ratio probed by using the embodiment of the present disclosure as input.

Optimal transmission signal configuration is obtained according to the accurate signal to noise ratio obtained based on the signal transmission apparatus of the embodiment of the present disclosure. FIG. 12 is a schematic diagram of comparison of a transmission signal modulation format obtained by taking the signal to noise ratio probed by using the probing method in the relevant art as input and a transmission signal modulation format obtained by taking the signal to noise ratio probed by using the embodiment of the present disclosure as input. As shown in FIG. 12, as the signal to noise ratio is accurately estimated, the recommended modulation bits of the signal to noise ratio probed based on the embodiment of the present disclosure are less than 1 bit in most subcarriers than the recommended modulation bits of the signal to noise ratio of the existing method, this avoids a risk of possible degradation of the bit error rate of the actual transmission, even transmission failure, of the existing method, and ensures the reliability and stability of the communication system. The transmission signal configuration determining the signal modulation formats of the embodiment of the present disclosure is illustrated above only, and furthermore, for example, the relevant art may be adopted for determining power allocation configuration or bandwidth configuration of a signal, which shall not be described herein any further.

The accurate signal to noise ratio and the optimal transmission signal configuration probed based on the signal transmission apparatus of the embodiment of the present disclosure are able to improve performance of the signal transmission. For example, symbols of the signal configuration at the actual transmission stage are those shown in Table 1 below; where, n is an index of a subcarrier, and N is the number of available subcarriers.

TABLE 1

| Meaning | Values are expressed by variables as | Unit |
|---|---|---|
| Power of each subcarrier | P1, P2, ..., Pn, ... | watt |
| Modulation bits of each subcarrier | b1, b2, ..., bn, ... | bit |
| Probed signal to noise ratio of each subcarrier | g1, g2, ..., gn, ... | 1 |
| Symbol error rate target | SERtrgt | 1 |

Detailed steps for predicting the actual transmission performance are as follows, and it should be noted that the following formulae are implementations of the first calculating unit 501, the second calculating unit 502 and the third calculating unit 503, and this embodiment of the present disclosure is not limited thereto.

First, the first calculating unit 501 is configured to calculate owned signal to noise ratio, denoted by SNRmargin, under given power allocation and bit allocation according to the probed signal to noise ratio and symbol error rate target of each subcarrier by using Formula (1):

$$SNRmargin = \left[\prod_{n \leq N} \frac{Pn * gn}{(2^{bn} - 1) * \Gamma(SERtrgt)}\right]^{1/N}, \quad (1)$$

$$其中 \Gamma(x) = \frac{2}{3} \text{erfc} inv(x/2)^2.$$

The second calculating unit 502 is configured to calculate the extra signal to noise ratio margin of the bit error rate, denoted by addmargin, introduced by the difference between the definitions of the symbol error rate and the bit error rate by using Formula (2):

$$addmargin = \frac{\Gamma\left(SERtrgt \bigg/ \left[\frac{1}{N}\sum_{n \leq N} bn\right]\right)}{\Gamma(SERtrgt)}. \quad (2)$$

And the third calculating unit 503 is configured to calculate the bit error rate and the Q value margin at the actual transmission stage, denoted respectively by estimateBER and QdBmargin, according to the signal to noise ratio margins calculated by formulae (1) and (2) by using formulae (3) and (4):

$$estimateBER = \quad (3)$$
$$\text{erfc}\left(\sqrt{3/2 * SNRmargin * addmargin * \Gamma\left(SERtrgt \bigg/ \left[\frac{1}{N}\sum_{n \leq N} bn\right]\right)}\right) * \frac{2}{\left[\frac{1}{N}\sum_{n \leq N} bn\right]};$$

$$QdBmargin = Qdb(estimateBER) - Qdb(SERtrgt), \quad (4)$$
$$其中 Qdb(x) = 20 * \log10(\sqrt{2}\, \text{erfc} inv(2x)).$$

Figure 13:
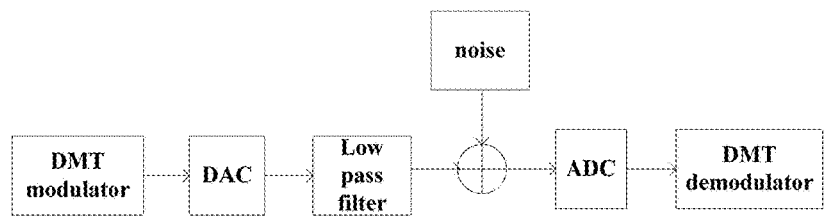
FIG. 13 is a schematic diagram of a structure of the DMT transmission system of Embodiment 2 of the present disclosure.

FIG. 13 is a systematic block diagram of DMT simulation of the linear channel of the embodiment of the present disclosure, which is used to explain performance of the above method for predicting the bit error rate. The number of the subcarriers in the DMT system may be set as demanded, a data sampling rate is 61 Gsa/s, an actual transmission capacity is fixed as 107 Gbps, and the symbol error rate target is 1e-3.

Figure 14:
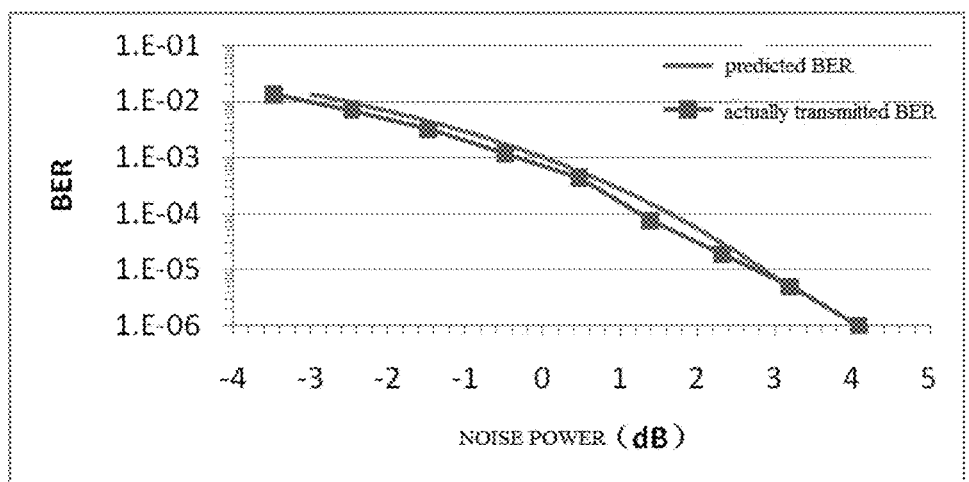
FIG. 14 is a schematic diagram of comparison of predicted transmission performance and actually transmitted transmission performance of Embodiment 2 of the present disclosure.
Figure 15:
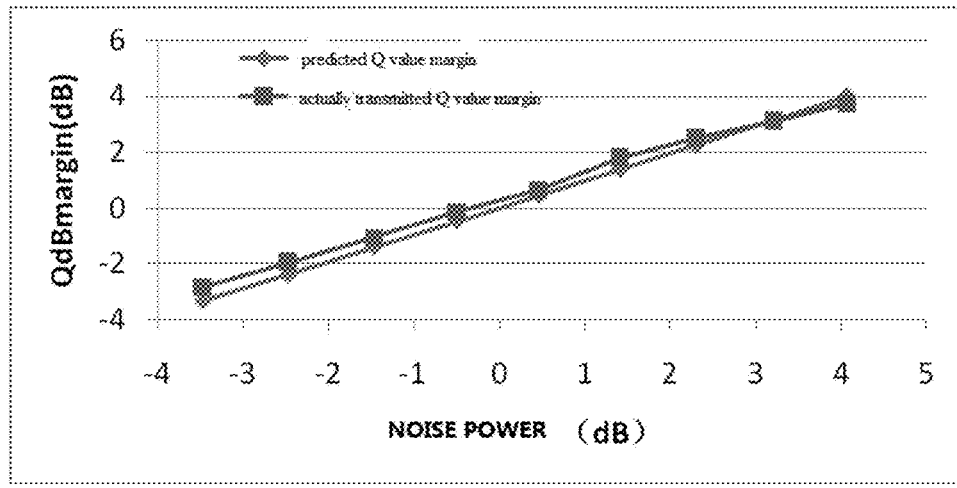
FIG. 15 is a schematic diagram of comparison of predicted transmission performance and actually transmitted transmission performance of Embodiment 2 of the present disclosure.

FIGS. 14 and 15 are schematic diagrams of comparison of predicted transmission performance and actually transmitted transmission performance of the embodiment of the present disclosure described by taking the DMT system as an example. As shown in FIGS. 14 and 15, the predicted bit error rate and Q value margin are extremely close to the actually transmitted bit error rate and Q value margin, that is, with the above embodiment of the present disclosure, accuracy of the prediction of performance of the actual transmission may be improved based on the probed accurate signal to noise ratio and optimal actually transmitted signal configuration.

Embodiment 3

An embodiment of the present disclosure provides a signal transmission method, corresponding to the signal transmission apparatus in Embodiment 1 or 2, with identical contents being not going to be described herein any further.

Figure 16:
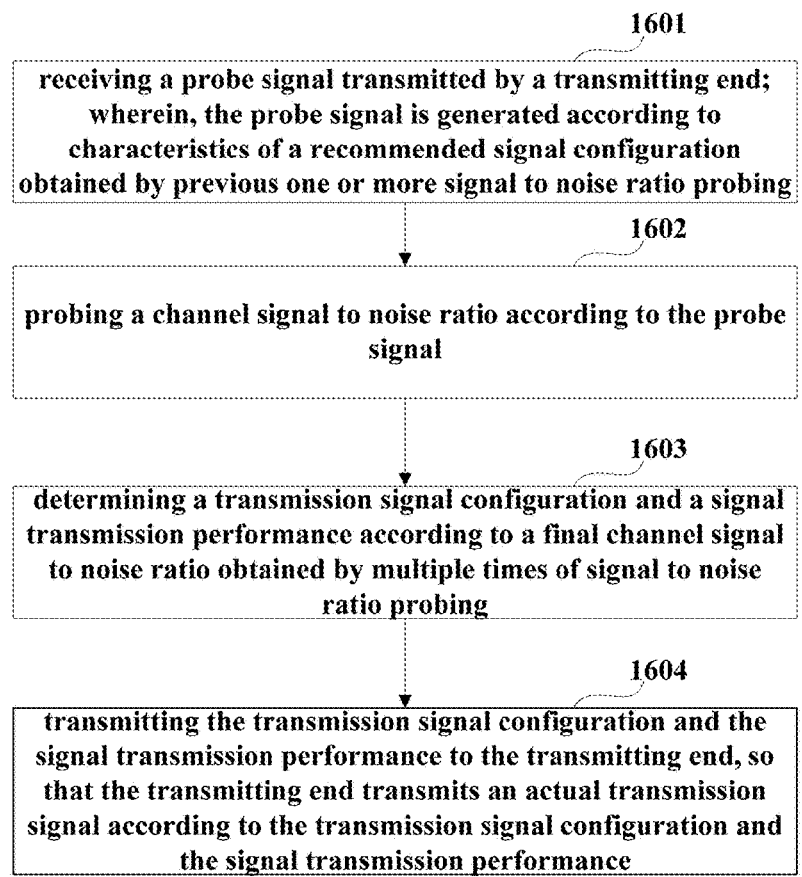
FIG. 16 is a flowchart of the signal transmission method of Embodiment 3 of the present disclosure.

FIG. 16 is a flowchart of the signal transmission method of the embodiment of the present disclosure. As shown in FIG. 16, the signal transmission method includes:

step 1601: receiving a probe signal transmitted by a transmitting end; the probe signal is generated according to characteristics of recommended signal configuration obtained by previous one or more signal to noise ratio probing;

step 1602: probing a channel signal to noise ratio according to the probe signal;

step 1603: determining transmission signal configuration and signal transmission performance according to a final channel signal to noise ratio obtained by multiple times of signal to noise ratio probing; and step 1604: transmitting the transmission signal configuration and the signal transmission performance to the transmitting end, so that the transmitting end transmits an actual transmission signal according to the transmission signal configuration and the signal transmission performance.

With the above signal transmission method, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

In this embodiment, the characteristics of the recommended signal configuration are one or more of the following: a power allocation characteristic, a bit allocation characteristic, and a bandwidth characteristic. The above characteristics wholly or partially embody a contribution of a nonlinear noise of a signal at an actual transmission stage to the signal to noise ratio, thereby being more advantageous to reducing deviation of a signal to noise ratio probed at latter time of recursion from a signal to noise ratio at the actual transmission stage. In this embodiment, configuration of a predetermined probe signal probed for a first time may be determined by using the relevant art, and this embodiment is not limited thereto.

For example, the power allocation characteristic may be that power allocation of each subcarrier also satisfies a recommended configured power allocation relationship, and the bit allocation characteristic may be a modulation format of each subcarrier, etc., and this embodiment is not limited thereto.

In this embodiment, configuration of a predetermined probe signal probed for a first time may be determined by using the relevant art, and this embodiment is not limited thereto.

In this embodiment, the number of times of the signal to noise ratio probing, that is, the number of times of recursion of the signal to noise ratio probing, may be any predetermined value, and this embodiment is not limited thereto.

In this embodiment, the transmission signal configuration may include such configuration information of a signal as power allocation, bit allocation, and a bandwidth, etc., and the transmission performance may include determining such performance of the signal as a bit error rate, and a Q value margin, etc., and this embodiment is not limited thereto.

In this embodiment, the signal transmission method may further include (not shown) generating the recommended signal configuration according to a signal to noise ratio obtained in each time of probing, and transmitting the recommended signal configuration to the transmitting end, so that the transmitting end generates and transmits the probe signal according to the characteristics of the recommended signal configuration.

In an implementation, after the number of times of signal to noise ratio probing reaches a first threshold value in step 1603, the transmission signal configuration is determined according to a finally probed channel signal to noise ratio, and the signal transmission performance is determined according to the finally probed channel signal to noise ratio and the transmission signal configuration.

After the number of times of signal to noise ratio probing reaches the first threshold value, the finally probed channel signal to noise ratio may be used to perform adaptive modulation allocation to determine the transmission signal configuration, and a particular implementation is similar to that in Embodiment 2, and shall not be described herein any further.

Figure 17:
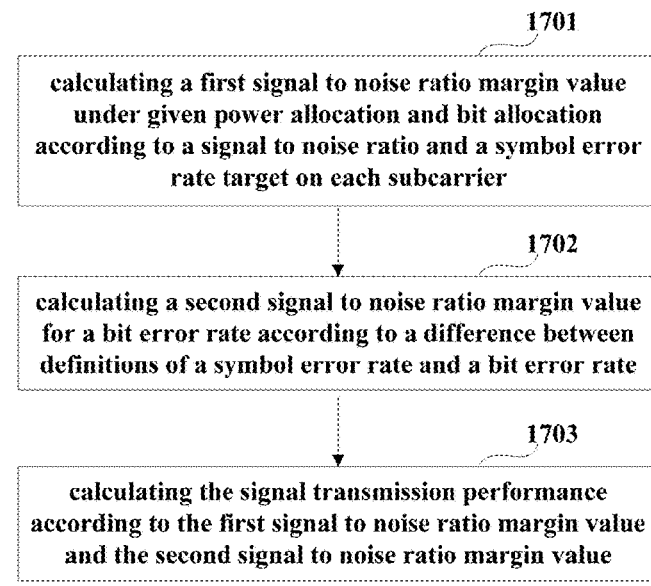
FIG. 17 is a flowchart of an implementation of step 1603 of Embodiment 3 of the present disclosure.

FIG. 17 is a flowchart of an implementation of step 1603 of Embodiment 3 of the present disclosure in which the signal transmission performance is determined according to a finally probed channel signal to noise ratio and the transmission signal configuration. The method may include:

step 1701: calculating a first signal to noise ratio margin value under given power allocation and bit allocation according to a signal to noise ratio and a symbol error rate target on each subcarrier;

step 1702: calculating a second signal to noise ratio margin value for a bit error rate according to a difference between definitions of a symbol error rate and a bit error rate; and step 1703: calculating the signal transmission performance according to the first signal to noise ratio margin value and the second signal to noise ratio margin value.

Particular implementations of steps 1701-1703 are identical to those of the first calculating unit 501, the second calculating unit 502 and the third calculating unit 503 in Embodiment 2, the contents of which being incorporated herein, and being not going to be described herein any further.

In this embodiment, an extra signal to noise ratio margin value of the bit error rate is calculated according to the difference between the definitions of the symbol error rate and the bit error rate, thereby improving accuracy of prediction of the transmission performance.

In this embodiment, before step 1602, the signal transmission method may further include a preprocessing step (not shown), in which the probe signal is preprocessed; The preprocessing may include equalization processing, etc., and this embodiment is not limited thereto.

Embodiment 4

Embodiment 4 of the present disclosure provides a receiver, including the signal transmission apparatus as described in Embodiment 1 or 2, with identical contents being not going to be described herein any further.

In this embodiment, the method in Embodiment 3 may be referred to for a particular implementation of the receiver, with repeated parts being not going to be described herein any further.

Figure 18:
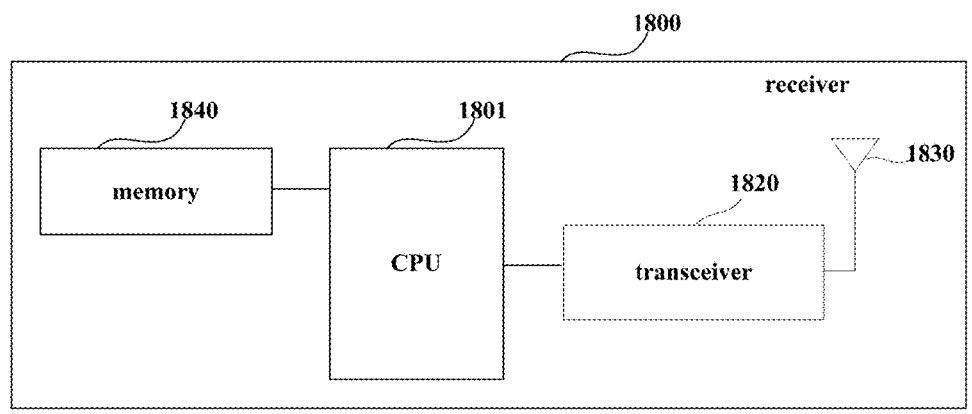
FIG. 18 is a schematic diagram of a structure of the receiver of Embodiment 4 of the present disclosure.

FIG. 18 is a block diagram of a systematic structure of the receiver 1800 of the embodiment of the present disclosure. As shown in FIG. 18, the receiver 1800 may include a central processing unit 1801 and a memory 1840, the memory 1840 being coupled to the central processing unit 1801. It should be noted that this figure is illustrative only, and other types of structures may also be used, so as to supplement or replace this structure and achieve telecommunications function or other functions.

In an implementation, the functions of the signal transmission apparatus may be integrated into the central processing unit 1801. The central processing unit 1801 may be configured to: receive a probe signal transmitted by a transmitting end; the probe signal is generated according to characteristics of recommended signal configuration obtained by previous one or more times of signal to noise ratio probing; probe a channel signal to noise ratio of according to the probe signal; determine transmission signal configuration and signal transmission performance according to a final channel signal to noise ratio obtained by multiple times of signal to noise ratio probing; and transmit the transmission signal configuration and signal transmission performance to the transmitting end, so that the transmitting end transmits an actual transmission signal according to the transmission signal configuration and the signal transmission performance.

The central processing unit 1801 may further be configured to be that the characteristics of the recommended signal configuration are one or more of the following: a power allocation characteristic, a bit allocation characteristic, and a bandwidth characteristic.

The central processing unit 1801 may further be configured to: generate the recommended signal configuration according to a channel signal to noise ratio obtained in each time of probing; and transmit the recommended signal configuration to the transmitting end, so that the transmitting end generates and transmits the probe signal according to the characteristics of the recommended signal configuration.

The central processing unit 1801 may further be configured to: determine the transmission signal configuration according to a finally probed channel signal to noise ratio after the number of times of signal to noise ratio probing reaches a first threshold value; and determine the signal transmission performance according to the finally probed channel signal to noise ratio and the determined transmission signal configuration.

The central processing unit 1801 may further be configured to: determine the transmission signal configuration by using the finally probed channel signal to noise ratio to perform adaptive modulation allocation after the number of times of signal to noise ratio probing reaches the first threshold value.

The central processing unit 1801 may further be configured to: calculate a first signal to noise ratio margin value under given power allocation and bit allocation according to a signal to noise ratio and a symbol error rate target on each subcarrier;

calculate a second signal to noise ratio margin value for a bit error rate according to a difference between definitions of a symbol error rate and a bit error rate; and calculate the signal transmission performance according to the first signal to noise ratio margin value the second signal to noise ratio margin value.

The central processing unit 1801 may further be configured to be that the second signal to noise ratio margin value is calculated according to a formula as below:

$$addmargin = \frac{\Gamma\left(SERtrgt / \left[\frac{1}{N}\sum_{n\leq N} bn\right]\right)}{\Gamma(SERtrgt)};$$

where, addmargin denotes the second signal to noise ratio margin value, SERtrgt denotes a symbol error rate target, bn denotes a modulation bit of each subcarrier, n is an index of a subcarrier, and N is the number of available subcarriers.

In another implementation, the signal transmission apparatus and the central processing unit 1801 may be configured separately. For example, the signal transmission apparatus may be configured as a chip connected to the central processing unit 1801, with its functions being realized under control of the central processing unit.

As shown in FIG. 18, the receiver 1800 may further include a transceiver 1820, and an antenna 1830, etc. It should be noted that the receiver 1800 does not necessarily include all the parts shown in FIG. 18. And furthermore, the receiver 1800 may include components not shown in FIG. 18, and the relevant art may be referred to.

As shown in FIG. 18, the central processing unit 1801 is sometimes referred to as a controller or control, and may include a microprocessor or other processor devices and/or logic devices.

The memory 1840 may be, for example, one or more of a buffer memory, a flash memory, a hard drive, a mobile medium, a volatile memory, a nonvolatile memory, or other suitable devices. It may store SNRs of multiple times of recursion and signal configuration, and may further store programs executing related information. And the central processing unit 100 may execute the programs stored in the memory 1840, so as to realize information storage or processing, etc. Functions of other parts are similar to those of the relevant art, which shall not be described herein any further. The parts of the receiver 1800 may be realized by specific hardware, firmware, software, or any combination thereof, without departing from the scope of the present disclosure.

With the above receiver, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

Embodiment 5

Figure 19:
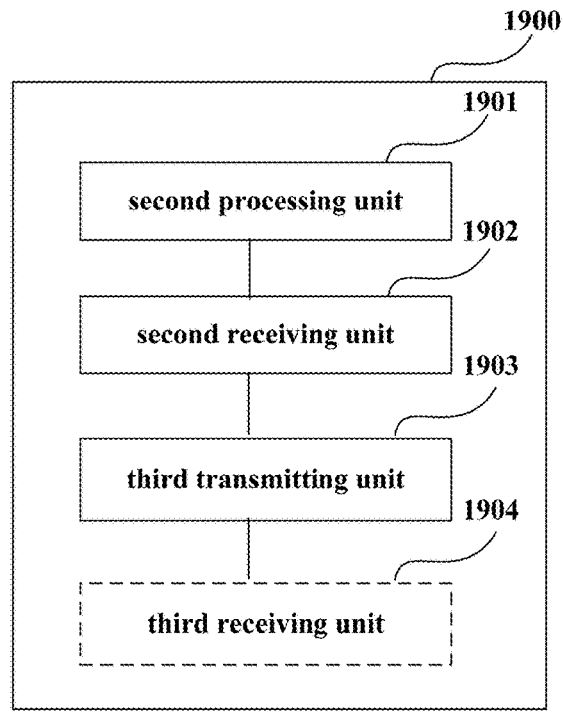
FIG. 19 is a schematic diagram of a structure of the signal transmission apparatus of Embodiment 5 of the present disclosure.

Embodiment 5 of the present disclosure provides a signal transmission apparatus. FIG. 19 is a schematic diagram of a structure of the signal transmission apparatus of the embodiment of the present disclosure. As shown in FIG. 19, the signal transmission apparatus 1900 includes:

- a second processing unit 1901 configured to generate a probe signal for probing a channel signal to noise ratio according to characteristics of recommended signal configuration obtained by previous one or more times of signal to noise ratio probing;
- a second receiving unit 1902 configured to receive transmission signal configuration and signal transmission performance transmitted by a receiving end; and
- a third transmitting unit 1903 configured to transmit an actual transmission signal according to the transmission signal configuration and the signal transmission performance.

In this embodiment, the characteristics of the recommended signal configuration are one or more of the following: a power allocation characteristic, a bit allocation characteristic, and a bandwidth characteristic. The above characteristics wholly or partially embody a contribution of a nonlinear noise of a signal at an actual transmission stage to the signal to noise ratio, thereby being more advantageous to reducing deviation of a signal to noise ratio probed at latter time of recursion from a signal to noise ratio at the actual transmission stage. In this embodiment, configuration of a predetermined probe signal probed for a first time may be determined by using the relevant art, and this embodiment is not limited thereto.

For example, the power allocation characteristic may be that power allocation of each subcarrier also satisfies a recommended configured power allocation relationship, and the bit allocation characteristic may be a modulation format of each subcarrier, etc., that is, the probe signal used for signal to noise ratio probing is generated according to the power allocation characteristic, the bit allocation characteristic, and the bandwidth characteristic, and this embodiment is not limited thereto. Embodiment 2 may be referred to for a particular implementation of the second processing unit 1901, which shall not be described herein any further.

In this embodiment, the signal transmission apparatus 1900 may further include:

a third receiving unit 1904 configured to receive the recommended signal configuration generated according to a channel signal to noise ratio obtained in each time of probing and transmitted by the receiving end.

In this embodiment, the third receiving unit 1904 is optional.

With the above signal transmission apparatus, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

Embodiment 6

Embodiment 6 of the present disclosure provides a signal transmission method, corresponding to the signal transmission apparatus in Embodiment 5, with identical contents being not going to be described herein any further.

Figure 20:
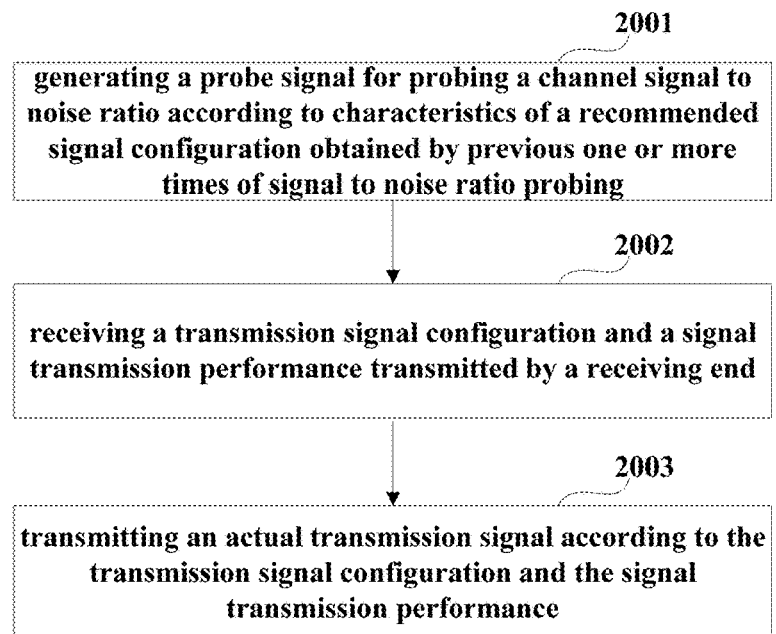
FIG. 20 is a flowchart of the signal transmission method of Embodiment 6 of the present disclosure.

FIG. 20 is a flowchart of the signal transmission method of the embodiment of the present disclosure. As shown in FIG. 20, the signal transmission method includes:

- step 2001: generating a probe signal for probing a channel signal to noise ratio according to characteristics of recommended signal configuration obtained by previous one or more times of signal to noise ratio probing;
- step 2002: receiving transmission signal configuration and signal transmission performance transmitted by a receiving end; and
- step 2003: transmitting an actual transmission signal according to the transmission signal configuration and the signal transmission performance.

In this embodiment, the characteristics of the recommended signal configuration are one or more of the following: a power allocation characteristic, a bit allocation characteristic, and a bandwidth characteristic. Embodiment 2 may be referred to for a particular implementation, and being not going to be described herein any further. The above characteristics wholly or partially embody a contribution of a nonlinear noise of a signal at an actual transmission stage to the signal to noise ratio, thereby being more advantageous to reducing deviation of a signal to noise ratio probed at latter time of recursion from a signal to noise ratio at the actual transmission stage. In this embodiment, configuration of a predetermined probe signal probed for a first time may be determined by using the relevant art, and this embodiment is not limited thereto.

Embodiment 2 may be referred to for a particular implementation of step 2001, the contents of which being incorporated herein, and being not going to be described herein any further.

In this embodiment, the signal transmission method may further include: receiving the recommended signal configuration generated according to a channel signal to noise ratio obtained in each time of probing and transmitted by the receiving end. This step is optional.

With the above signal transmission method, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

Embodiment 7

Embodiment 7 of the present disclosure provides a transmitter, including the signal transmission apparatus as described in Embodiment 5, with identical contents being not going to be described herein any further.

In this embodiment, the method in Embodiment 6 may be referred to for a particular implementation of the transmitter, with repeated parts being not going to be described herein any further.

Figure 21:
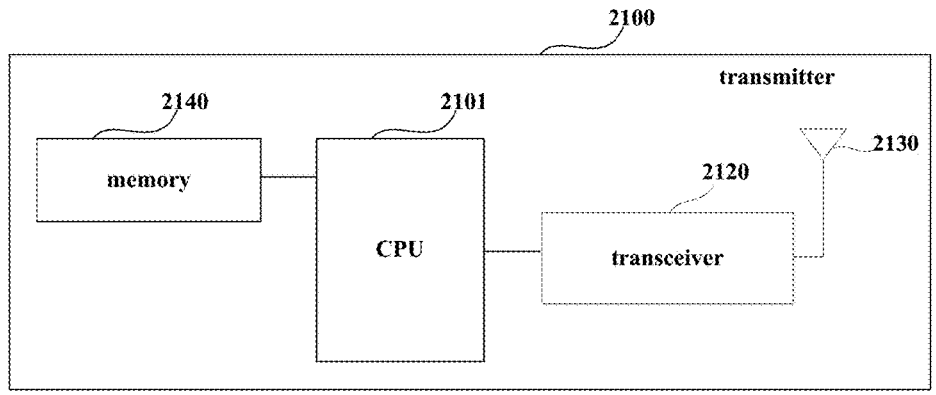
FIG. 21 is a schematic diagram of a structure of the transmitter of Embodiment 7 of the present disclosure.

FIG. 21 is a block diagram of a systematic structure of the transmitter 2100 of the embodiment of the present disclosure. As shown in FIG. 21, the transmitter 2100 may include a central processing unit 2101 and a memory 2140, the memory 2140 being coupled to the central processing unit 2101. It should be noted that this figure is illustrative only, and other types of structures may also be used, so as to supplement or replace this structure and achieve telecommunications function or other functions.

In an implementation, the functions of the signal transmission apparatus may be integrated into the central processing unit 2101. The central processing unit 2101 may be configured to: generate a probe signal for probing channel a signal to noise ratio according to characteristics of recommended signal configuration obtained by previous one or more times of signal to noise ratio probing; receive transmission signal configuration and signal transmission performance transmitted by a receiving end; and transmit an actual transmission signal according to the transmission signal configuration and the signal transmission performance.

The central processing unit 2101 may further be configured to: receive recommended signal configuration generated according to a signal to noise ratio of a channel obtained in each time of detection and transmitted by the receiving end.

In another implementation, the signal transmission apparatus and the central processing unit 2101 may be configured separately. For example, the signal transmission apparatus may be configured as a chip connected to the central processing unit 2101, with its functions being realized under control of the central processing unit.

As shown in FIG. 21, the transmitter 2100 may further include a transceiver 2120, and an antenna 2130, etc. It should be noted that the transmitter 2100 does not necessarily include all the parts shown in FIG. 21. And furthermore, the transmitter 2100 may include components not shown in FIG. 21, and the relevant art may be referred to.

As shown in FIG. 21, the central processing unit 2101 is sometimes referred to as a controller or control, and may include a microprocessor or other processor devices and/or logic devices.

The memory 2140 may be, for example, one or more of a buffer memory, a flash memory, a hard drive, a mobile medium, a volatile memory, a nonvolatile memory, or other suitable devices. It may store SNRs of multiple times of recursion and signal configuration, and may further store programs executing related information. And the central processing unit 100 may execute the programs stored in the memory 2140, so as to realize information storage or processing, etc. Functions of other parts are similar to those of the relevant art, which shall not be described herein any further. The parts of the transmitter 2100 may be realized by specific hardware, firmware, software, or any combination thereof, without departing from the scope of the present disclosure.

With the above transmitter, in each time of probing a signal to noise ratio, the used probe signals are different, that is, the nonlinear noise probed after multiple times of recursion are more close to the nonlinear noise at the actual transmission stage, thereby improving accuracy of probing nonlinear channel signal to noise ratio. Based on the above accurate signal to noise ratio, optimal transmission signal configuration and signal transmission performance may be obtained, and finally actually transmitted signals with optimal configuration are generated. The actually transmitted signals with optimal configuration not only contain optimal signal configuration of transmission data provided at the channel probing stage, but also contain configuration information on controllable modules according to the predicted transmission performance, such as an adaptive module, etc., thereby ensuring reliability and stability of the communication system.

Embodiment 8

An embodiment of the present disclosure further provides a multicarrier communication system, including:

a receiver configured to receive a probe signal transmitted by a transmitter, probe a channel signal to noise ratio according to the probe signal, determine transmission signal configuration and signal transmission performance according to a final channel signal to noise ratio obtained by multiple times of signal to noise ratio probing, and transmit the transmission signal configuration and the signal transmission performance to the transmitter; and the transmitter configured to generate and transmit the probe signal, the probe signal being generated according to characteristics of recommended signal configuration obtained by previous one or more times of signal to noise ratio probing, receive the transmission signal configuration and the signal transmission performance transmitted by the receiver, and transmit an actual transmission signal according to the transmission signal configuration and the signal transmission performance.

In an implementation of this embodiment, Embodiment 4 may be referred to for an implementation of the receiver, and Embodiment 7 may be referred to for an implementation of the transmitter, with identical contents being not going to be described herein any further.

Figure 22:
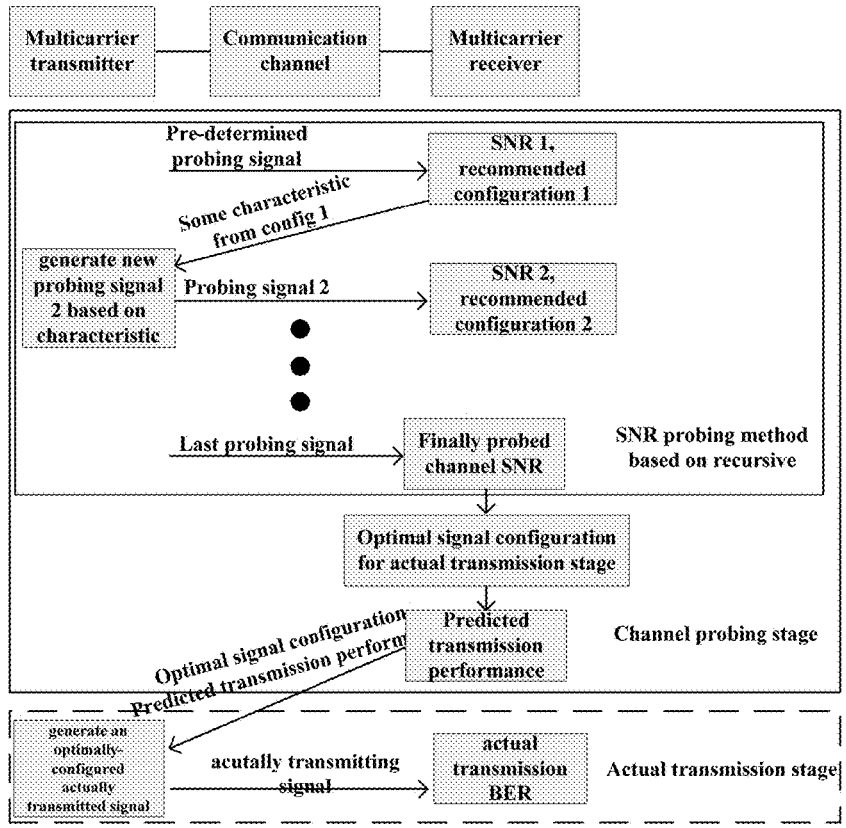
FIG. 22 is a schematic diagram of a structure of the multicarrier communication system and the transmission scheme of Embodiment 8 of the present disclosure.

FIG. 22 is a schematic diagram of a structure of the multicarrier communication system and the transmission scheme of Embodiment 8 of the present disclosure. As shown in FIG. 22, the transmitter generates the predetermined probe signal, and transmits the signal to the receiver after the signal passes through a communication channel; the receiver performs signal processing after receiving the probe signal, compares the processed received signal with the original probe signal subcarrier by subcarrier, obtains a signal to noise ratio 1 through calculation, gives recommended signal configuration 1 according to the signal to noise ratio 1, and feeds the recommended signal configuration 1 back to the transmitter; the transmitter receives the configuration 1 and selects all or part of characteristics from the configuration 1, and generates and transmits a new probe signal 2; the probe signal 2 passes through the channel and is processed at the receiver, the probe signal 2 after being processed by the receiver is compared with the original probe signal 2 subcarrier by subcarrier, a signal to noise ratio 2 is calculated, recommended signal configuration 2 is given according to the signal to noise ratio 2, and a finally probed channel signal to noise ratio is obtained after multiple times of recursion; the receiver determines actually transmitted optimal signal configuration according to the final signal to noise ratio and predicts transmission performance, and at the same time, transmits the determined signal configuration and transmission performance to the transmitter; and the transmitter generates an optimally-configured actually transmitted signal according to the signal configuration and transmission performance, and transmits the signal, so that the receiver accurately estimates performance of the actual transmission, thereby providing services to design of the system, such as avoiding invalid transmission unsatisfying traffic demands, etc.

According to the transmission scheme of the multicarrier communication system provided by the embodiment of the present disclosure, based on the accurate signal to noise ratio probed by multiple times of recursion, actually transmitted signals of optimal configuration are generated, which not only contain optimal signal configuration of transmission data provided at the signal probing stage, but also contain configuration information on controllable modules according to the predicted transmission performance, such as an adaptive module, etc., thereby ensuring reliability and stability of the communication system.

An embodiment of the present disclosure further provides a computer-readable program, when the program is executed in a receiver, the program enables a computer to carry out the signal transmission method as described in Embodiment 3 in the receiver.

An embodiment of the present disclosure further provides a storage medium in which a computer readable program is stored, the computer readable program enables a computer to carry out the signal transmission method as described in Embodiment 3 in a receiver.

An embodiment of the present disclosure further provides a computer-readable program, when the program is executed in a transmitter, the program enables a computer to carry out the signal transmission method as described in Embodiment 6 in the transmitter.

An embodiment of the present disclosure further provides a non-transitory computer readable storage medium which stores a computer readable program, the computer readable program enables a computer to carry out the signal transmission method as described in Embodiment 6 in a transmitter.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For the implementation containing the above embodiments, following supplements are further disclosed.

Supplement 1. A signal transmission apparatus, comprising:
  a first receiving unit configured to receive a probe signal transmitted by a transmitting end; wherein, the probe signal is generated according to characteristics of recommended signal configuration obtained by previous one or more times of signal to noise ratio probing;
  a first processing unit configured to probe a channel signal to noise ratio according to the probe signal;
  a first determining unit configured to determine transmission signal configuration and signal transmission performance according to a final channel signal to noise ratio obtained by multiple times of signal to noise ratio probing; and
  a first transmitting unit configured to transmit the transmission signal configuration and the signal transmission performance to the transmitting end, so that the transmitting end transmits an actual transmission signal according to the transmission signal configuration and the signal transmission performance.

Supplement 2. The signal transmission apparatus according to supplement 1, wherein the characteristics of the recommended signal configuration are one or more of the following: a power allocation characteristic, a bit allocation characteristic, and a bandwidth characteristic.

Supplement 3. The signal transmission apparatus according to supplement 1, wherein the signal transmission apparatus further comprises:
  a first generating unit configured to generate the recommended signal configuration according to a channel signal to noise ratio obtained in each time of probing; and
  a second transmitting unit configured to transmit the recommended signal configuration to the transmitting end, so that the transmitting end generates and transmits the probe signal according to the characteristics of the recommended signal configuration.

Supplement 4. The signal transmission apparatus according to supplement 1, wherein the first determining unit further comprises:
  a second determining unit configured to determine the transmission signal configuration according to a finally probed channel signal to noise ratio after the number of times of signal to noise ratio probing by the first processing unit reaches a first threshold value; and
  a third determining unit configured to determine the signal transmission performance according to the channel signal to noise ratio finally probed by the first processing unit and the transmission signal configuration determined by the second determining unit.

Supplement 5. The signal transmission apparatus according to supplement 4, wherein the second determining unit is configured to determine the transmission signal configuration by using the finally probed channel signal to noise ratio to performing adaptive modulation allocation after the number of times of signal to noise ratio probing by the first processing unit reaches the first threshold value.

Supplement 6. The signal transmission apparatus according to supplement 4, wherein the third determining unit further comprises:
  a first calculating unit configured to calculate a first signal to noise ratio margin value under given power allocation and bit allocation according to a signal to noise ratio and a symbol error rate target on each subcarrier;
  a second calculating unit configured to calculate a second signal to noise ratio margin value for a bit error rate according to a difference between definitions of a symbol error rate and a bit error rate; and
  a third calculating unit configured to calculate the signal transmission performance according to the first signal to noise ratio margin value calculated by the first calculating unit and the second signal to noise ratio margin value calculated by the second calculating unit.

Supplement 7. The signal transmission apparatus according to supplement 6, wherein the second calculating unit calculates the second signal to noise ratio margin value according to a formula as below:

$$addmargin = \frac{\Gamma\left(SERtrgt \Big/ \left[\frac{1}{N}\sum_{n\leq N} bn\right]\right)}{\Gamma(SERtrgt)};$$

where, addmargin denotes the second signal to noise ratio margin value, SERtrgt denotes a symbol error rate target, bn denotes a modulation bit on each subcarrier, n is an index of a subcarrier, and N is the number of available subcarriers.

Supplement 8. A signal transmission apparatus, comprising:
a second processing unit configured to generate a probe signal for probing a channel signal to noise ratio according to characteristics of recommended signal configuration obtained by previous one or more times of signal to noise ratio probing;
a second receiving unit configured to receive transmission signal configuration and signal transmission performance transmitted by a receiving end; and
a third transmitting unit configured to transmit an actual transmission signal according to the transmission signal configuration and the signal transmission performance.

Supplement 9. The signal transmission apparatus according to supplement 8, wherein the signal transmission apparatus further comprises:
a third receiving unit configured to receive the recommended signal configuration generated according to a channel signal to noise ratio obtained in each time of probing and transmitted by the receiving end.

Supplement 10. A multicarrier communication system, comprising:
a receiver configured to receive a probe signal transmitted by a transmitter, probe a channel signal to noise ratio according to the probe signal, determine transmission signal configuration and signal transmission performance according to a final channel signal to noise ratio obtained by multiple times of signal to noise ratio probing, and transmit the transmission signal configuration and the signal transmission performance to the transmitter; and
the transmitter configured to generate and transmit the probe signal, the probe signal being generated according to characteristics of recommended signal configuration obtained by previous one or more times of signal to noise ratio probing, receive the transmission signal configuration and the signal transmission performance transmitted by the receiver, and transmit an actual transmission signal according to the transmission signal configuration and the signal transmission performance.

Supplement 11. A signal transmission method, including:
receiving a probe signal transmitted by a transmitting end; wherein, the probe signal is generated according to characteristics of recommended signal configuration obtained by detecting previous one or more times of signal to noise ratio probing;
probing a channel signal to noise ratio according to the probe signal;
determining transmission signal configuration and signal transmission performance according to a final channel signal to noise ratio obtained by multiple times of signal to noise ratio probing; and
transmitting the transmission signal configuration and the signal transmission performance to the transmitting end, so that the transmitting end transmits an actual transmission signal according to the transmission signal configuration and the signal transmission performance.

Supplement 12. The signal transmission method according to supplement 11, wherein the characteristics of the recommended signal configuration are one or more of the following: a power allocation characteristic, a bit allocation characteristic, and a bandwidth characteristic.

Supplement 13. The signal transmission method according to supplement 1, wherein the signal transmission method further includes:
generating the recommended signal configuration according to a channel signal to noise ratio obtained in each time of probing; and
transmitting the recommended signal configuration to the transmitting end, so that the transmitting end generates and transmits the probe signal according to the characteristics of the recommended signal configuration.

Supplement 14. The signal transmission method according to supplement 11, wherein the determining transmission signal configuration and signal transmission performance according to a channel final signal to noise ratio obtained by multiple times of signal to noise ratio probing further includes:
determining the transmission signal configuration according to a finally probed channel signal to noise ratio after the number of times of signal to noise ratio probing reaches a first threshold value; and
determining the signal transmission performance according to the finally probed channel signal to noise ratio and the transmission signal configuration.

Supplement 15. The signal transmission method according to supplement 14, wherein after the number of times of signal to noise ratio probing reaches the first threshold value, the finally probed channel signal to noise ratio is used for performing adaptive modulation allocation to determine the transmission signal configuration.

Supplement 16. The signal transmission method according to supplement 14, wherein the determining the signal transmission performance according to the finally probed channel signal to noise ratio and the transmission signal configuration further includes:
calculating a first signal to noise ratio margin value under given power allocation and bit allocation according to a signal to noise ratio and a symbol error rate target of each subcarrier;
calculating a second signal to noise ratio margin value for a bit error rate according to a difference between definitions of a symbol error rate and a bit error rate; and
calculating the signal transmission performance according to the first signal to noise ratio margin value and the second signal to noise ratio margin value.

Supplement 17. The signal transmission method according to supplement 16, wherein the second signal to noise ratio margin value is calculated according to a formula as below:

$$addmargin = \frac{\Gamma\left(SERtrgt \Big/ \left[\frac{1}{N}\sum_{n\leq N} bn\right]\right)}{\Gamma(SERtrgt)};$$

where, addmargin denotes the second signal to noise ratio margin value, SERtrgt denotes a symbol error rate target, bn denotes a modulation bit on each subcarrier, n is an index of a subcarrier, and N is the number of available subcarriers.

Supplement 18. A signal transmission method, including:
generating a probe signal for probing a channel signal to noise ratio according to characteristics of recommended signal configuration obtained by previous one or more times of signal to noise ratio probing;
receiving transmission signal configuration and signal transmission performance transmitted by a receiving end; and
transmitting an actual transmission signal according to the transmission signal configuration and the signal transmission performance.

Supplement 19. The signal transmission method according to supplement 18, wherein the signal transmission method further includes:
Receiving the recommended signal configuration generated according to a channel signal to noise ratio obtained in each time of probing and transmitted by the receiving end.

Supplement 20. A receiver, including the signal transmission apparatus as described in any one of supplements 1-7.

Supplement 21. A transmitter, including the signal transmission apparatus as described in any one of supplements 8-9.

Supplement 22. A computer-readable program, wherein when the program is executed in a transmitter, the program enables a computer to carry out the signal transmission method as described in any one of supplements 18-19 in the transmitter.

Supplement 23. A storage medium in which a computer readable program is stored, wherein the computer readable program enables a computer to carry out the signal transmission method as described in any one of supplements 11-17 in a receiver.

Although a few embodiments have been shown and described, it would be appreciated by those skilled in the art that changes may be made in these embodiments without departing from the principles and spirit of the disclosure, the scope of which is defined in the claims and their equivalents.

What is claimed is:

1. A signal transmission apparatus, comprising:
a receiver configured to receive a probe signal transmitted by a transmitting end where the probe signal is generated according to characteristics of a recommended signal configuration obtained by a previous one or more signal to noise ratio probings;
a processor configured to:
probe a channel signal to noise ratio according to the probe signal;
determine actual transmission signal configuration and a signal transmission performance according to a final channel signal to noise ratio obtained by multiple signal to noise ratio probings; and
a transmitter configured to transmit the actual transmission signal configuration and the signal transmission performance to the transmitting end where the transmitting end transmits an actual transmission signal according to the actual transmission signal configuration and the signal transmission performance;
wherein the receiver is further configured to:
determine the actual transmission signal configuration according to a finally probed channel signal to noise ratio after a number of times of signal to noise ratio probing by the processor reaches a first threshold value,
determine the signal transmission performance according to the channel signal to noise ratio finally probed and the actual transmission signal configuration determined;
calculate a first signal to noise ratio margin value under given power allocation and bit allocation according to a signal to noise ratio and a symbol error rate target of each respective subcarrier;
calculate a second signal to noise ratio margin value for a bit error rate according to a difference between definitions of a symbol error rate and a bit error rate; and
calculate the signal transmission performance according to the first signal to noise ratio margin value calculated and the second signal to noise ratio margin value calculated.

2. The signal transmission apparatus according to claim 1, wherein the characteristics of the recommended signal configuration are one or more of: a power allocation characteristic, a bit allocation characteristic, and a bandwidth characteristic.

3. The signal transmission apparatus according to claim 1, wherein the processor of the signal transmission apparatus is further configured to:
generate the recommended signal configuration according to a channel signal to noise ratio obtained in each probing; and
transmit the recommended signal configuration to the transmitting end
where the transmitting end generates and transmits the probe signal according to the characteristics of the recommended signal configuration.

4. The signal transmission apparatus according to claim 1, wherein the actual transmission signal configuration is determined by using the final probed channel signal to noise ratio to perform adaptive modulation allocation after a number of times of signal to noise ratio probing by the processor reaches the first threshold value.

5. The signal transmission apparatus according to claim 1, wherein the second signal to noise ratio margin value is calculated according to:

$$addmargin = \frac{\Gamma\left(SERtrgt \Big/ \left[\frac{1}{N}\sum_{n \leq N} bn\right]\right)}{\Gamma(SERtrgt)};$$

where add margin denotes the second signal to noise ratio margin value, SERtrgt denotes symbol error rate target, bn denotes a modulation bit of each respective subcarrier, n is an index of a subcarrier, and N is a number of available subcarriers.

6. A signal transmission apparatus, comprising:
a processor configured to generate a probe signal for probing a channel signal to noise ratio according to characteristics of a recommended signal configuration obtained by one or more previous signal to noise ratio probings;
a receiver configured to receive actual transmission signal configuration and a signal transmission performance transmitted by a receiving end, wherein actual transmission signal configuration and the signal transmission performance is determined by the receiving end by:
determining the actual transmission signal configuration according to a finally probed channel signal to noise ratio after the number of times of signal to noise ratio probing reaches a first threshold value; and determining the signal transmission performance according to the channel signal to noise ratio finally probed and the actual transmission signal configuration, the signal transmission performance being determined by the receiving end according to the channel signal to noise ratio finally probed and the actual transmission signal configuration by:

calculating a first signal to noise ratio margin value under given power allocation and bit allocation according to a signal to noise ratio and a symbol error rate target of each respective subcarrier;

calculating a second signal to noise ratio margin value for a bit error rate according to a difference between definitions of a symbol error rate and a bit error rate; and calculating the signal transmission performance according to the first signal to noise ratio margin value and the second signal to noise ratio margin value; and a transmitter configured to transmit an actual transmission signal according to the actual transmission signal configuration and the signal transmission performance.

7. The signal transmission apparatus according to claim 6, wherein the signal transmission apparatus further comprises:

a configuration receiver configured to receive the recommended signal configuration generated according to a channel signal to noise ratio obtained in each probing and transmitted by the receiving end.

8. A multicarrier communication system, comprising:

a receiver configured to:
receive a probe signal transmitted by a transmitter, probe a channel signal to noise ratio according to the probe signal,
determine actual transmission signal configuration and a signal transmission performance according to a final channel signal to noise ratio obtained by multiple signal to noise ratio probings, and
transmit the actual transmission signal configuration and the signal transmission performance to the transmitter;

wherein the receiver determines actual transmission signal configuration and a signal transmission performance according to a final channel signal to noise ratio obtained by multiple signal to noise ratio probings by:

determining the actual transmission signal configuration according to a finally probed channel signal to noise ratio after the number of times of signal to noise ratio probing reaches a first threshold value; and determining the signal transmission performance according to the channel signal to noise ratio finally probed and the actual transmission signal configuration; wherein the receiver determines the signal transmission performance according to the channel signal to noise ratio finally probed and the actual transmission signal configuration by:

calculating a first signal to noise ratio margin value under given power allocation and bit allocation according to a signal to noise ratio and a symbol error rate target of each respective subcarrier;

calculating a second signal to noise ratio margin value for a bit error rate according to a difference between definitions of a symbol error rate and a bit error rate; and calculating the signal transmission performance according to the first signal to noise ratio margin value and the second signal to noise ratio margin value; and wherein the transmitter is configured to generate and transmit the probe signal, the probe signal being generated according to characteristics of a recommended signal configuration obtained by one or more previous signal to noise ratio probings, receive the transmission signal configuration and the signal transmission performance transmitted by the receiver, and transmit an actual transmission signal according to the actual transmission signal configuration and the signal transmission performance.

9. A signal transmission method, comprising:

generating a probe signal for probing a channel signal to noise ratio according to characteristics of a recommended signal configuration obtained by one or more previous signal to noise ratio probings;

receiving actual transmission signal configuration and a signal transmission performance transmitted by a receiving end, wherein actual transmission signal configuration and the signal transmission performance is determined by the receiving end by the step of:

determining the actual transmission signal configuration according to a finally probed channel signal to noise ratio after the number of times of signal to noise ratio probing reaches a first threshold value; and determining the signal transmission performance according to the channel signal to noise ratio finally probed and the actual transmission signal configuration;

wherein the signal transmission performance is determined by the receiving end according to the channel signal to noise ratio finally probed and the actual transmission signal configuration by an operation of:

calculating a first signal to noise ratio margin value under given power allocation and bit allocation according to a signal to noise ratio and a symbol error rate target of each respective subcarrier;

calculating a second signal to noise ratio margin value for a bit error rate according to a difference between definitions of a symbol error rate and a bit error rate; and calculating the signal transmission performance according to the first signal to noise ratio margin value and the second signal to noise ratio margin value; and transmitting an actual transmission signal according to the actual transmission signal configuration and the signal transmission performance.

10. A non-transitory computer readable storage medium storing computer program codes which when executed by a processor cause the processor to perform the method according to claim 9.

* * * * *